Dec. 22, 1931.  V. L. RONCI  1,837,373
GLASS WORKING MACHINE
Filed Aug. 3, 1929  3 Sheets-Sheet 1

INVENTOR
V. L. RONCI
BY
Walter C. Kiesel
ATTORNEY

Dec. 22, 1931.  V. L. RONCI  1,837,373
GLASS WORKING MACHINE
Filed Aug. 3, 1929  3 Sheets-Sheet 2

INVENTOR
V. L. RONCI
BY
Walter E. Kiesel
ATTORNEY

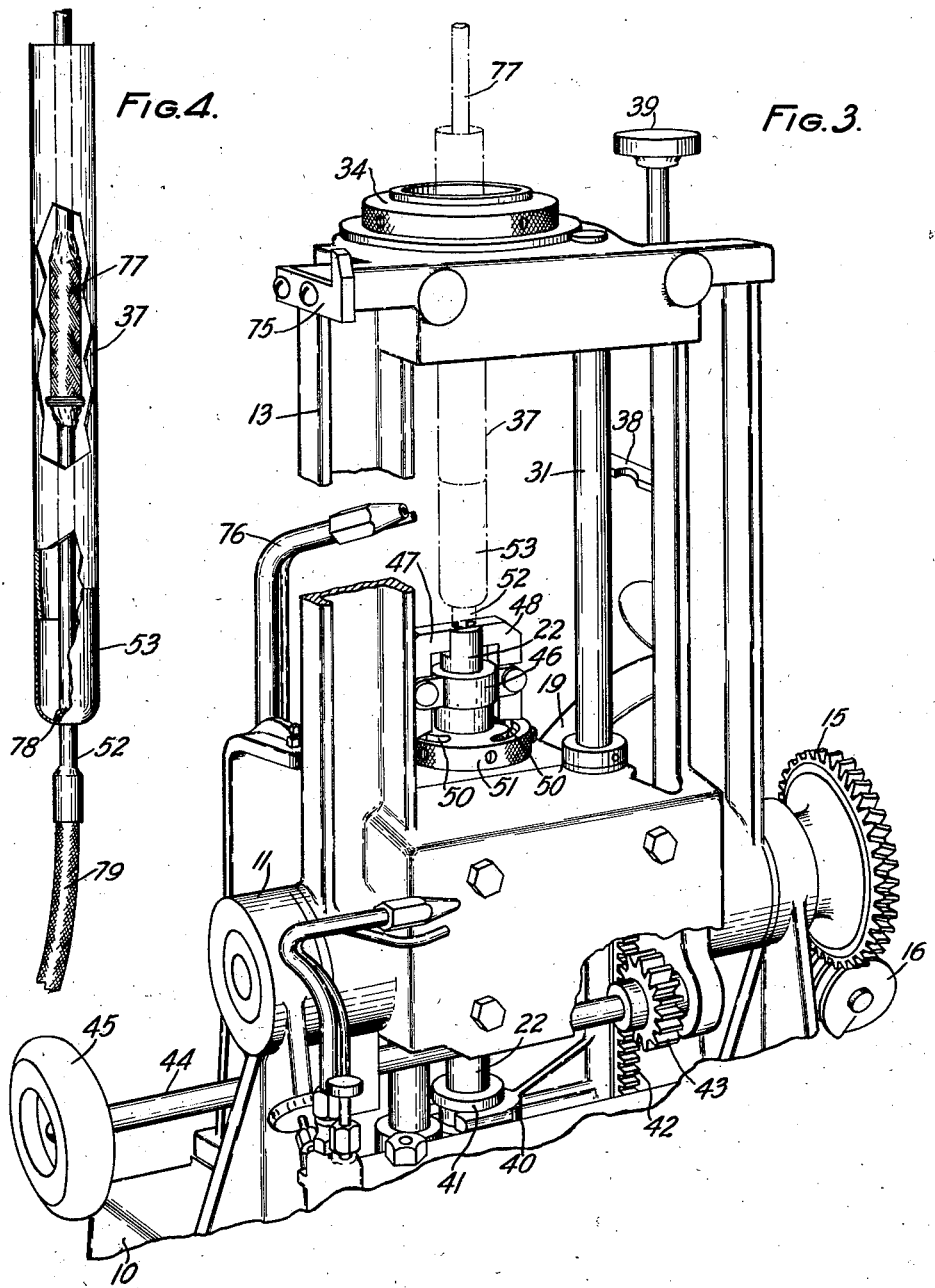

Patented Dec. 22, 1931

1,837,373

UNITED STATES PATENT OFFICE

VICTOR L. RONCI, OF BROOKLYN, NEW YORK, ASSIGNOR TO BELL TELEPHONE LABORATORIES, INCORPORATED, OF NEW YORK, N. Y., A CORPORATION OF NEW YORK

GLASS WORKING MACHINE

Application filed August 3, 1929. Serial No. 383,253.

This invention relates to glass working machines and more particularly to such machines for sealing glass to metal.

An object of the invention is to form a uniform sealed joint between a glass portion and a metallic portion in an efficient manner and at low cost.

In accordance with this invention the sealed joint between a glass tubular member and a metallic cup member employed as a large diameter leading-in conductor for high power electron discharge devices, is produced by a mechanism having a stationary base and a pivotally movable sub-base. The sub-base is provided with two rotatable carriers, one carrier supporting the tubular glass member and the other carrier supporting the metallic cup member, the latter carrier being slidably adjustable on the sub-base. A heating torch frame located on the base and extending to a position between the rotatable carriers is adapted for reciprocating movement to heat the rotating glass member and the cup member to fuse these elements together. This arrangement produces a uniformly tight sealed joint between the contacting surfaces of the cup and glass members.

A feature of the invention relates to the assembly of the machine so that after the seal is completed the sub-base may be elevated to a vertical position where a stationary torch heats the base of the cup seal and a leading-in wire is fused to the inner surface of the cup seal. This arrangement produces a low resistance connection between the leading-in wire and the cup seal and facilitates the accurate centering of the leading-in wire with respect to the glass tubular member since the rotation of the finished seal in the vertical position readily discloses any eccentricity of the leading-in wire.

Another feature of the invention relates to a common driving mechanism for rotating the carriers in synchronism to maintain them in accurate coaxial and longitudinal alignment. This arrangement comprises a spool gear assembly on one end of the sub-base coupled to a driving motor and a driven shaft connected to the spool gear rotates the carrier on the opposite end of the sub-base.

A further feature of the invention relates to slidably adjusting the cup supporting carrier into engagement with the glass tubular member. This comprises a shaft slidably and rotatably movable which is controlled by a fork manually operated through a handwheel to cause forward movement of the metallic cup into engagement with the glass tubular member.

Another feature of the invention relates to an adjustable wiping arm which is inserted through the rotating carrier and glass tubular member to press the plastic glass of the heated glass tubular member to the inner surface of the metallic cup to form a tight joint.

Still another feature relates to injecting air into the plastic glass tubular member to prevent collapse of the glass due to external pressure. This arrangement comprises a swinging arm on the end of the base adjacent the glass supporting carrier which is brought into engagement with the open end of the glass tubular member so that the air may be injected into the tubular member to maintain the internal pressure the same as the external pressure.

These and other features of the invention will be clearly understood from the following detailed description in connection with the accompanying drawings in which:

Fig. 3 is a perspective view showing the sub-base elevated to its vertical position with parts broken away to show various details; and Fig. 4 illustrates partly in cross-section the sealed joint between the metallic cup and the glass tubular member employed as a large diameter leading-in conductor for electron discharge devices.

Figure 1:
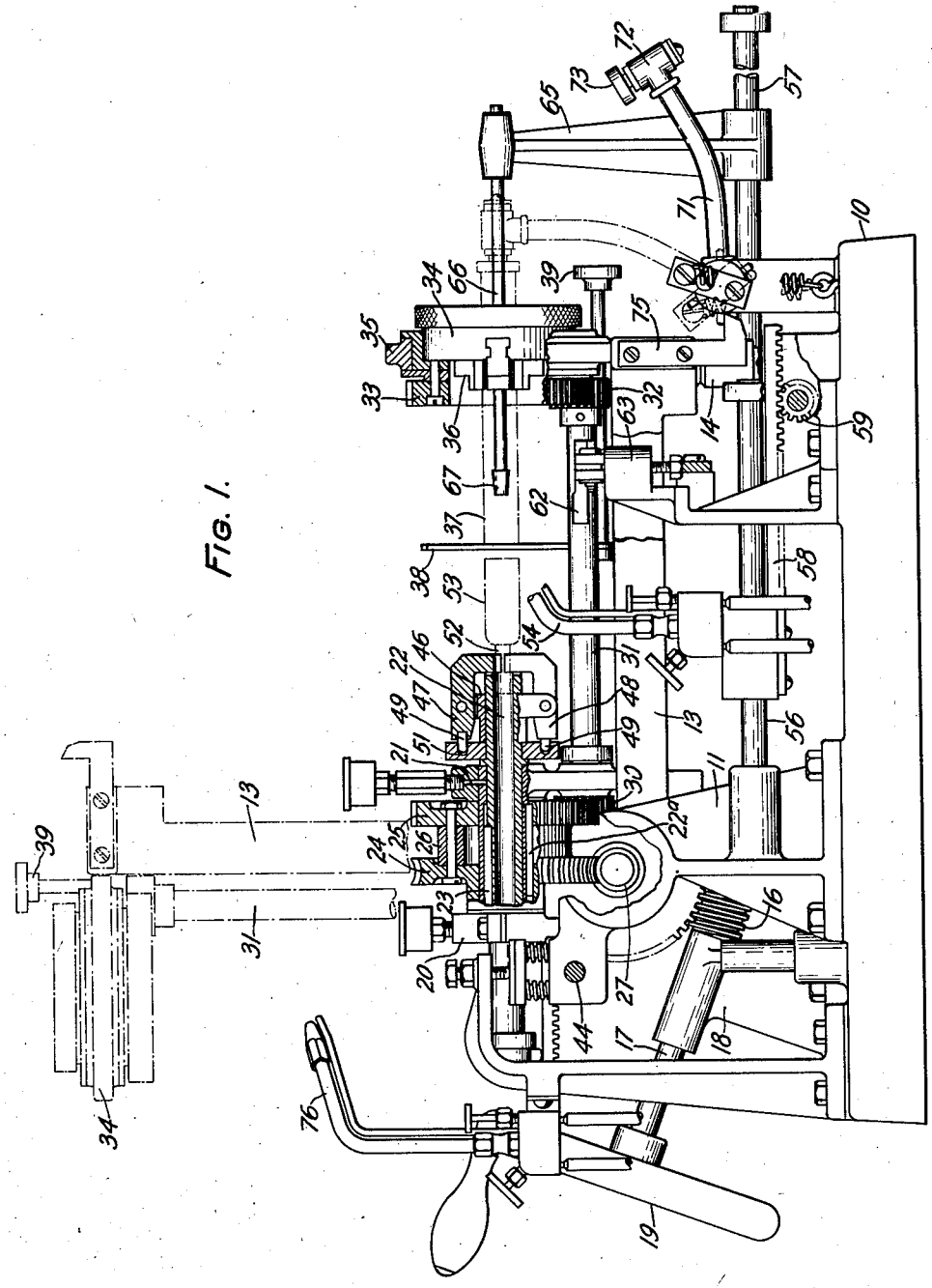
Fig. 1 is a front view in elevation of the glass working machine made in accordance with this invention showing the pivoted sub-base in both operating positions and with parts broken away to show the detailed construction.

Referring to the drawings the machine of this invention is adapted to form a permanent hermetic seal between a metallic cup member and a glass tubular member in accordance with the method described in W. G. Housekeeper Patent 1,294,466, dated February 18, 1919, in which the metallic member is provided with a tapered surface terminating in a knife-edge portion and the glass portion is fused to the inner surface of the knife-edge portion. In accordance with this invention this type of seal is mechanically produced in a machine which comprises a cast stationary base portion 10, from which project bearing supports 11 and 12. These supports pivotally carry a movable sub-base frame casting 13 which normally lies parallel with the base 10 and is supported at the opposite end by cushion supports 14 on the base 10, one of which is shown in Fig. 1. A worm gear 15 rigidly attached to the sub-base 13 through the bearing 12 is coupled to a worm 16 carried by a shaft 17 supported at an angle in a journal housing 18. A handwheel 19 attached to shaft 17 rotates the worm 16 and gear 15 to elevate the sub-base to a position at right angles to the stationary base 10 to perform the second operation on the seal to be described in detail hereinafter.

Extending upright from the sub-base 13 are two separable bearings 20 and 21, the axes of which are at right angles to the axes of the bearings 11 and 12, and which support a tubular shafting 22 having a longitudinal slot or groove 23 which forms a keyway for a spool gear assembly. This spool gear assembly comprises a worm gear 24 and a spur gear 25 rigidly connected together by a spacing collar 26 and is supported in the bearings 20 and 21 by a sleeve 22a which is also keyed to the shafting 22. A worm 27 coupled to the worm gear 24 is connected to a motor 28 by a shaft 29 extending through the gear 15 and the bearing 12. This arrangement imparts a driving movement to the worm gear 24 and since the spur gear 25 is rigidly attached to the worm gear 24 by the collar 26, similar movement is applied to this gear. The driven gear 25 is coupled to a small gear 30 attached at one end of a shaft 31 and another small gear 32 at the other end of the shaft is coupled to a spur gear 33 attached to a rotatable scroll chuck or carrier 34 supported in an annular housing 35 rigidly attached to the frame of the sub-base 13. This driving mechanism insures synchronous rotation of the hollow shaft 22 and the scroll chuck 34 in coaxial and longitudinal alignment. The scroll chuck 34 is provided with adjustable jaws 36 which engage a tubular glass vessel or member 37 (shown in outline) which extends through the chuck 34. A swinging arm 38 controlled by a knob 39 on the rear of the sub-base 13 serves as a gauge when the tubular glass member 37 is inserted in the carrier 34.

The tubular shaft 22 coupled to the spool gear assembly is adapted for slidable movement regardless of the rotating movement applied thereto by the spool gear assembly keyed in the groove 23 in the tubular shaft 22 so that the shaft may slide reciprocally with respect to the rotating spool gear assembly. This is accomplished by a fork member 40 engaging a grooved collar 41 on the end of the hollow shaft 22, the fork being rigidly attached to a track shaft 42 which is in engagement with a spur gear 43 attached to shaft 44. A manually operated hand-wheel 45 attached to the shaft 44 and located at the front of the machine facilitates adjustable movement of the shaft 22. The hollow shaft is provided with an adjustable carrier member at the other end opposite the scroll chuck or carrier 34. This carrier comprises a stationary collar 46 attached to the hollow shaft and a pair of pivoted jaws 47 and 48 carried by the collar and provided with pins 49 which enter spiral grooves or slots 50 in an adjustable ring 51. The rotation of the adjustable ring 51 causes pins 49 to travel in the slots 50 toward the periphery of the collar 51 to force the free ends of the jaws 47—48 into the slotted end of the hollow shaft to grip a solid extension 52 on a metallic cup member 53 shown in outline in the figures. This cup member is provided with a tapered knife edge which is adapted to slide over the edge of the glass tubular member 37.

The rotatable carriers on the sub-base 13, which are rotatable in synchronism to rotate the metallic cup 53 held in the carrier jaws 47 and 48, and the glass tubular member 37 held in jaws 36 of the scroll chuck 34, insure accurate axial movement of the free ends of metallic cup 53 and the glass tube 37, so that a uniform seal may be made between these surfaces when the cup member 53 is advanced to the sealing position. Prior to the seal being made the free end of the glass tubular member 37 is heated to reduce the external diameter of the glass tube so that the tapered edge of the cup member 53 may enclose a portion of the glass tubular member 37. For this purpose a heater torch 54 is supported on a carriage 55 which slides along parallel bars 56 and 57 which extend longitudinally of the stationary base 10 at the front and rear thereof. The carriage or frame 55 is provided with a track shaft 58 which meshes with a gear 59 attached to shaft 60 having a handwheel 61 at its outer end. This arrangement facilitates reciprocal movement of the carriage 55 supporting the burner 54 in any position between the rotating carriers on the sub-base.

Figure 2:
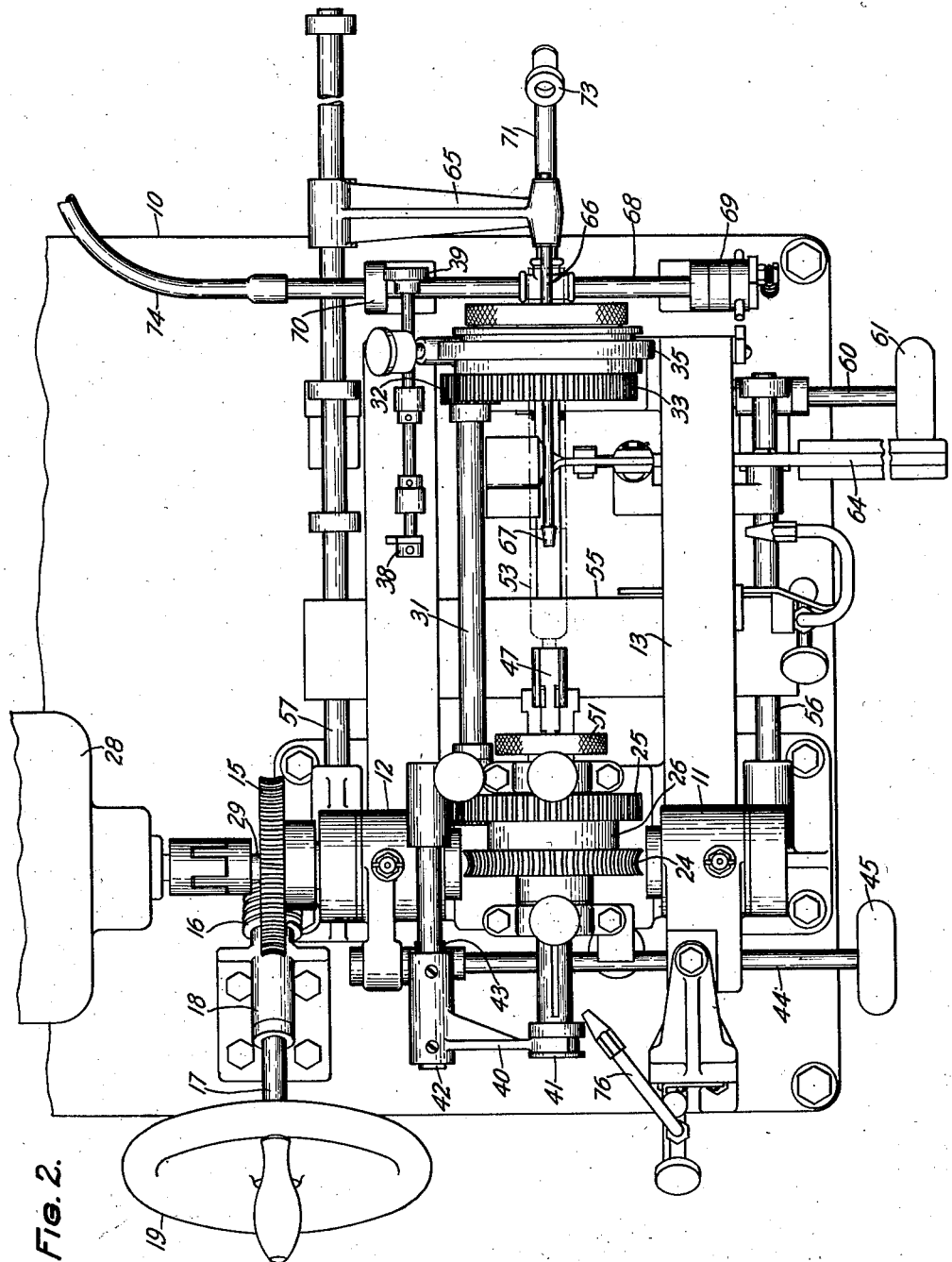
Fig. 2 is a top view of the machine shown in Fig. 1 illustrating the driving mechanism and the relative positions of the various parts of the machine.

The first operation to form the seal between the metallic cup member 53 and the glass tubular member 37 is to taper the free end of the glass tubular member 37 by projecting the flame from the torch 54 toward the free end of the glass tubular member 37 to render the glass plastic, so that it may be shaped to fit into the cup member 53. The shaping of the free end of the glass tubular member 37 is accomplished by metallic block 62 pivotally attached to a support 63 and connected to an arm 64 to raise the block into engagement with the free end of the glass tubular member 37, to reduce the diameter of the glass tubular member. When this is accomplished the handwheel 45 is operated to advance the metallic cup member 53 held in the slidable shaft 22 into engagement with the reduced end of the hollow glass member 37. The carriage 55 is slidably movable on the shafts 56 and 57 by operating the handwheel 61 to cause the torch 54 to direct a heating flame toward the contacting ends of the rotating cup 53 and glass tube 37 to fuse the glass to the metallic cup. During this period a high heating temperature is maintained in the area of the seal between the cup member 53 and the glass tube 37. When the glass is sufficiently plastic to form the seal to the cup member 53, a slidable arm 65 carried by the shaft 57 and having a rod 66 with a tapered end portion 67 is inserted through the tubular glass member 37 and the carrier 34 as shown in Fig. 2, the tapered portion 67 pressing the plastic glass against the tapered surface of the rotating cup member 53 to form an intimate joint. After this operation is completed the rod 66 is removed from the glass tubular member 37, and air is injected into the glass tubular member to prevent the external pressure causing collapse of the plastic glass in the vicinity of the seal. This is accomplished by providing a hollow shaft 68 swinging in bearing supports 69 and 70 and a bent arm 71 is joined to the shaft 68 intermediate the bearings. The arm 71 carries a coupling 72 at its free end connected to a thick rubber washer 73. A flexible hose connection 74 is joined to the hollow shaft 68 to provide a path for injecting air into the arm 71. As shown in Fig. 1 the arm 71 is swung to an upright position so that the rubber washer 73 engages the open end of the tubular glass member 37 and the air transmitted through the swinging arm 71 enters the glass tube 37 to maintain the internal pressure approximately the same as the external pressure to prevent collapse of the plastic glass in the vicinity of the seal.

When the seal is completed between the cup member 53 and the glass member 37, handwheel 19 is operated to elevate the sub-base 13 to a vertical position as shown in Fig. 3. When the sub-base is moved to a vertical position a trip member 75 swings the arm 71 from its vertical position so that the air injecting mechanism is disconnected from the glass member 37 and the sealed joint between the glass member 37 and the metallic cup member 53 is transferred to an upright position where a stationary burner torch 76 projects a heating flame toward the joint. The scroll chuck 34 is then loosened so that the joined glass member 37 and cup 53 are rotated and supported by the rotating carrier on the other end of the sub-base. The next operation consists in intensely heating the base of the cup member 53. This is accomplished by raising the carrier assembly to a position opposite the burner torch 76 and reciprocally moving the rotating seal in this flame by operating the handwheel 45. A leading-in wire 77 is inserted into the glass tubular member so that the leading-in wire may be fused to the base of the cup member 53 with silver solder as shown at 78 in Fig. 4. During the rotation of the glass member 37 and cup 53 in this position any eccentricity of the leading-in wire 77 with respect to the glass vessel may be easily determined and rectified to insure coaxial alignment of the leading-in wire and tubular glass member 37. The completed assembly of the sealed conductor is removed from the machine by loosening the ring 51 and withdrawing the assembly through the scroll chuck 34. A flexible connection 79 is fused to the extension 52 on the cup member 53 to form the complete leading-in conductor for high power electric discharge devices.

While the invention has been disclosed to illustrate a type of seal produced between a metallic member and a glass member, it is, of course, understood that a seal may also be formed between two glass members supported in opposing carriers and the invention is only to be limited within the scope of the appended claims.

What is claimed is:

1. A sealing machine comprising a rigid base, a movable sub-base on said base, a rotatable carrier fixed at one end of said sub-base, and a slidable and rotatable carrier at the other end of said sub-base.

2. A sealing machine comprising a rigid base, a movable sub-base on said base, a rotatable carrier fixed at one end of said sub-base, a slidable and rotatable carrier at the other end of said sub-base, and a movable heater frame between said carriers.

3. A glass working machine comprising a base portion, a sub-base pivotally attached to said base portion, a rotatable carrier at each end of said sub-base, and means for swinging said sub-base to a position at an angle to said base portion.

4. A glass working machine comprising a base portion, a sub-base pivotally attached to said base portion, a rotatable carrier at each end of said sub-base, a movable heater torch between said carriers, and means for swinging said sub-base portion to a position at an angle to said base portion.

5. A glass working machine comprising a base portion, a sub-base pivotally attached to said base portion, a rotatable carrier at each end of said sub-base, a movable heater carriage between said carriers, means for swinging said sub-base portion to a position at an angle to said base portion, and a stationary heater torch adjacent one of said carriers in its second position.

6. A glass working machine comprising a base portion, a sub-base pivotally attached to said base portion, a rotatable carrier at each end of said sub-base, a heater carriage between said carriers, and means connected to said carriage for slidably moving said carriage in opposite directions.

7. A glass working machine comprising a base portion, a sub-base pivotally attached to said base portion, a pair of rotatable carriers supported on said sub-base, and means slidably adjusting one of said carriers.

8. A glass working machine comprising a base portion, a sub-base pivotally attached to said base portion, a pair of rotatable carriers supported on said sub-base, and wiping means extending through one of said carriers.

9. A glass working machine comprising a base portion, a sub-base pivotally attached to said base portion, a pair of rotatable carriers supported on said sub-base, one of said carriers adapted to support a hollow vitreous member, a swinging arm on one end of said base, and means connected to said arm for injecting air into the vitreous member.

10. A glass working machine comprising a base portion, a sub-base pivotally attached to said base portion, a pair of rotatable carriers supported on said sub-base, a swinging arm on one end of said base adapted to engage a hollow vitreous member supported in one of said carriers, and means carried by said sub-base to disconnect said swinging arm when said sub-base is adjusted to a different position.

11. A glass working machine comprising a stationary base, a sub-base pivotally attached to said stationary base, a rotatable carrier at each end of said sub-base, means for driving said carriers coaxially in longitudinal alignment, and means for changing the position of said sub-base whereby said carriers are driven coaxially in vertical alignment.

12. A glass working machine comprising a stationary base, a sub-base pivotally attached to said stationary base, a carrier member rotatably movable on each end of said sub-base, and means engaging one of said carriers for slidable movement thereof with respect to said other carrier.

13. A glass working machine comprising a base, a movable sub-base on said base and extending parallel thereto, a pair of rotatable carrier members supported on said sub-base, a normally inactive rotatable member rigidly attached to said sub-base, and means operatively engaging said rotatable member to elevate said sub-base to a position at right angles to said base.

14. A glass working machine comprising a stationary base, a movable sub-base on said base and extending parallel thereto, a pair of rotatable carrier members supported on said sub-base, means to elevate said sub-base to a position at right angles to said base, a burner torch on said base adapted for reciprocating movement between said rotatable carriers, and a stationary burner torch on said base adapted to heat an article held in said carriers in the elevated position of said sub-base.

15. A glass working machine comprising a stationary base, a sub-base pivotally attached to said stationary base, a rotatable carrier on one end of said sub-base adapted to support a vitreous tubular member, a second rotatable carrier on the other end of said sub-base adapted to support a metallic cup member coaxially with respect to the tubular member, means for advancing the cup member into engagement with the tubular member, reciprocating heater means fusing the rotating members together, and slidable means extending into the tubular member to press the vitreous tubular member to the cup member.

In witness whereof, I hereunto subscribe my name this 2d day of August, 1929.

VICTOR L. RONCI.